(12) United States Patent
Gould

(10) Patent No.: US 10,774,672 B2
(45) Date of Patent: Sep. 15, 2020

(54) ROTARY ACTUATOR FOR VARIABLE VANE ADJUSTMENT SYSTEM

(71) Applicant: United Technologies Corporation, Hartford, CT (US)

(72) Inventor: Spencer Gould, Palm Beach Gardens, FL (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1120 days.

(21) Appl. No.: 14/765,398

(22) PCT Filed: Feb. 6, 2014

(86) PCT No.: PCT/US2014/014991
§ 371 (c)(1),
(2) Date: Aug. 3, 2015

(87) PCT Pub. No.: WO2014/133724
PCT Pub. Date: Sep. 4, 2014

(65) Prior Publication Data
US 2015/0361821 A1    Dec. 17, 2015

Related U.S. Application Data

(60) Provisional application No. 61/763,511, filed on Feb. 12, 2013.

(51) Int. Cl.
*F01D 17/16* (2006.01)
*F01D 17/20* (2006.01)
(Continued)

(52) U.S. Cl.
CPC ........... *F01D 17/16* (2013.01); *F01D 17/162* (2013.01); *F01D 17/20* (2013.01); *F04D 29/563* (2013.01);
(Continued)

(58) Field of Classification Search
CPC ........ F01D 17/162; F01D 17/16; F01D 17/20; F04D 29/563; F04D 29/667
(Continued)

(56) References Cited

U.S. PATENT DOCUMENTS 3,362,156 A * 1/1968 McLean .................. F02C 9/22
60/39.25
3,554,096 A    1/1971 DeJager
(Continued)

FOREIGN PATENT DOCUMENTS

JP      10054405       2/1998
JP      2003278555     10/2003

OTHER PUBLICATIONS

Parker Hannifin Corporation. HRN/HRN-C Series Hydraulic Vane Rotary Actuators. Parker. Wadsworth, Ohio.
(Continued)

*Primary Examiner* — Deming Wan
(74) *Attorney, Agent, or Firm* — Carlson, Gaskey & Olds, P.C.

(57) ABSTRACT

A variable vane actuator assembly for a gas turbine engine according to an exemplary aspect of the present disclosure includes, among other things, a plurality of vanes. A synchronization rings surrounds and is mechanically linked to drive the vanes to pivot for varying an angle of the vanes. A crank shaft is mechanically linked to the synchronization ring for rotating the synchronization ring. A fluid actuated rotary motor is located at an end of the crank shaft for selectively rotating the crank shaft.

27 Claims, 4 Drawing Sheets

(51) Int. Cl.
- *F04D 29/56* (2006.01)
- *F04D 29/66* (2006.01)
- *F01D 17/26* (2006.01)
- *F16C 3/22* (2006.01)
- *F16C 3/06* (2006.01)

(52) U.S. Cl.
CPC ........ *F01D 17/26* (2013.01); *F05D 2260/406* (2013.01); *F05D 2260/50* (2013.01); *F16C 3/06* (2013.01); *F16C 3/22* (2013.01); *F16C 2360/23* (2013.01)

(58) Field of Classification Search
USPC ................ 415/149.4, 149.3, 153.1, 160–164
See application file for complete search history.

(56) References Cited

U.S. PATENT DOCUMENTS

| | | | | |
|---|---|---|---|---|
| 3,583,417 | A * | 6/1971 | Clark | F02C 7/045 137/15.1 |
| 4,009,644 | A | 3/1977 | Higuchi et al. | |
| 4,070,800 | A * | 1/1978 | Brown | B66C 13/02 182/19 |
| 5,813,316 | A | 9/1998 | Sekiya et al. | |
| 6,289,787 | B1 * | 9/2001 | Underwood | F15B 15/12 92/121 |
| 6,318,668 | B1 * | 11/2001 | Ulanoski | B64C 29/0058 239/265.19 |
| 6,457,937 | B1 * | 10/2002 | Mashey | F01D 17/162 415/150 |
| 6,551,057 | B1 * | 4/2003 | Haaser | F01D 17/162 415/119 |
| 6,769,868 | B2 | 8/2004 | Harrold | |
| 7,162,945 | B2 * | 1/2007 | Tatsuya | B60G 17/0162 91/441 |
| 7,825,669 | B2 | 11/2010 | Parsons et al. | |
| 7,922,445 | B1 | 4/2011 | Pankey | |
| 8,052,373 | B2 | 11/2011 | Bolgar et al. | |
| 8,245,495 | B2 | 8/2012 | Pesyna et al. | |
| 8,511,974 | B2 * | 8/2013 | Hood | F01D 17/16 415/149.2 |
| 8,784,043 | B2 * | 7/2014 | Bouru | F04D 29/563 415/160 |
| 2004/0022624 | A1 * | 2/2004 | Harrold | F01D 17/162 415/162 |
| 2008/0069687 | A1 * | 3/2008 | Lace | F01D 17/162 415/145 |
| 2009/0226305 | A1 | 9/2009 | Wong et al. | |
| 2009/0318238 | A1 * | 12/2009 | Bolgar | F01D 17/162 464/37 |
| 2011/0033297 | A1 * | 2/2011 | Bouru | F04D 29/563 416/147 |
| 2011/0229310 | A1 * | 9/2011 | Colotte | F01D 17/16 415/149.4 |
| 2012/0076658 | A1 * | 3/2012 | Jarrett, Jr. | F01D 17/162 416/205 |
| 2012/0239198 | A1 * | 9/2012 | Orita | B25J 9/1641 700/260 |
| 2012/0308364 | A1 | 12/2012 | Hofmann | |
| 2013/0028716 | A1 * | 1/2013 | Bouru | F04D 29/563 415/150 |
| 2015/0240827 | A1 * | 8/2015 | Hoemke | F04D 29/563 415/1 |

OTHER PUBLICATIONS

International Search Report and Written Opinion for the PCT Application No. PCT/US2014/014991, dated May 27, 2014.
European Search Report for European Patent Application No. 14757584 completed Apr. 29, 2016.
International Preliminary Report on Patentability for PCT Application No. PCT/US2014/014991 dated Aug. 27, 2015.

* cited by examiner

ROTARY ACTUATOR FOR VARIABLE VANE ADJUSTMENT SYSTEM

BACKGROUND

This application relates to a system for pivoting a plurality of variable stator vanes, such as in a gas turbine engine for example.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

In general, the compressor and turbine section include circumferentially spaced vanes forming vane stages that are axially separated from adjacent vane stages by rotor blades. Some gas turbine engines include variable vanes that pivot about an axis to vary an angle of the vane to optimize engine performance. The variable vanes are mechanically connected to a synchronization ring by a vane arm to drive the variable vane to pivot as the synchronization ring is rotated. The synchronization ring is rotated by crank shaft that is mechanically connected to the synchronization ring. As the synchronization ring is rotated in a circumferential direction around the engine, the relative angle of variable vanes at each stage is varied in order to modify the amount of airflow through the engine.

Linear actuators are known in the art to rotate the crank shaft but generally require several additional moving parts to convert linear motion to rotary motion, with each of the moving parts contributing to vane position error. Engine stability and fuel consumption is related to the accuracy of positioning the angle of the vanes.

SUMMARY

A variable vane actuator assembly according to an exemplary aspect of the present disclosure includes, among other things, a plurality of vanes. A synchronization ring is mechanically linked to drive the vanes to pivot for varying an angle of the vanes. A crank shaft is mechanically linked to the synchronization ring. A fluid actuated rotary motor is located at an end of the crank shaft for selectively rotating the crank shaft.

In a further non-limiting embodiment of the foregoing variable vane actuator assembly, the rotary motor includes a first engagement feature and the crank shaft includes a second engagement feature connected to the first engagement feature.

In a further non-limiting embodiment of either of the foregoing variable vane actuator assemblies, the first engagement feature and the second engagement feature are splines.

In a further non-limiting embodiment of any of the foregoing variable vane actuator assemblies, the first engagement feature and the second engagement feature are fastened to each other.

In a further non-limiting embodiment of any of the foregoing variable vane actuator assemblies, the crank shaft includes a generally tubular configuration.

In a further non-limiting embodiment of any of the foregoing variable vane actuator assemblies, a ratio of an outer radius to an inner radius of the crank shaft is less than 2:1.

In a further non-limiting embodiment of any of the foregoing variable vane actuator assemblies, the variable vane actuator assembly includes a rotary position sensor for measuring an angular orientation of the rotary motor.

In a further non-limiting embodiment of any of the foregoing variable vane actuator assemblies, the rotary motor is in fluid communication with a fuel source.

In a further non-limiting embodiment of any of the foregoing variable vane actuator assemblies, the rotary motor includes an actuator vane for selectively rotating the crank shaft when an amount of fluid pressure is applied to the actuator vane.

A gas turbine engine according to another exemplary aspect of the present disclosure includes, among other things, a compressor section including a rotor section and a variable vane section adjacent to the rotor section. The variable vane section includes a plurality of vanes mounted to be capable of pivoting. A synchronization ring surrounds and is mechanically linked to drive the vanes to pivot for varying an angle of the vanes. A crank shaft is mechanically linked to the synchronization ring. A fluid actuated rotary motor is located at an end of the crank shaft for selectively rotating the crank shaft.

In a further non-limiting embodiment of the foregoing gas turbine engine, the crank shaft and the rotary motor are arranged about a first axis defined by the crank shaft, the first axis being parallel to a longitudinal axis defined by the engine.

In a further non-limiting embodiment of either of the foregoing gas turbine engines, the rotary motor includes a first engagement feature and the crank shaft includes a second engagement feature connected to the first engagement feature.

In a further non-limiting embodiment of any of the foregoing gas turbine engines, the first engagement feature and the second engagement feature are splines.

In a further non-limiting embodiment of any of the foregoing gas turbine engines, the first engagement feature and the second engagement feature are fastened to each other.

In a further non-limiting embodiment of any of the foregoing gas turbine engines, the crank shaft includes a generally tubular configuration.

In a further non-limiting embodiment of any of the foregoing gas turbine engines, a ratio of an outer radius to an inner radius of the crank shaft is less than 2:1.

In a further non-limiting embodiment of any of the foregoing gas turbine engines, the gas turbine engine includes a rotary position sensor for measuring an angular orientation of the rotary motor.

In a further non-limiting embodiment of any of the foregoing gas turbine engines, the rotary motor is in fluid communication with a fuel source.

In a further non-limiting embodiment of any of the foregoing gas turbine engines, the rotary motor includes an actuator vane for selectively rotating the crank shaft when an amount of fluid pressure is applied to the actuator vane.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
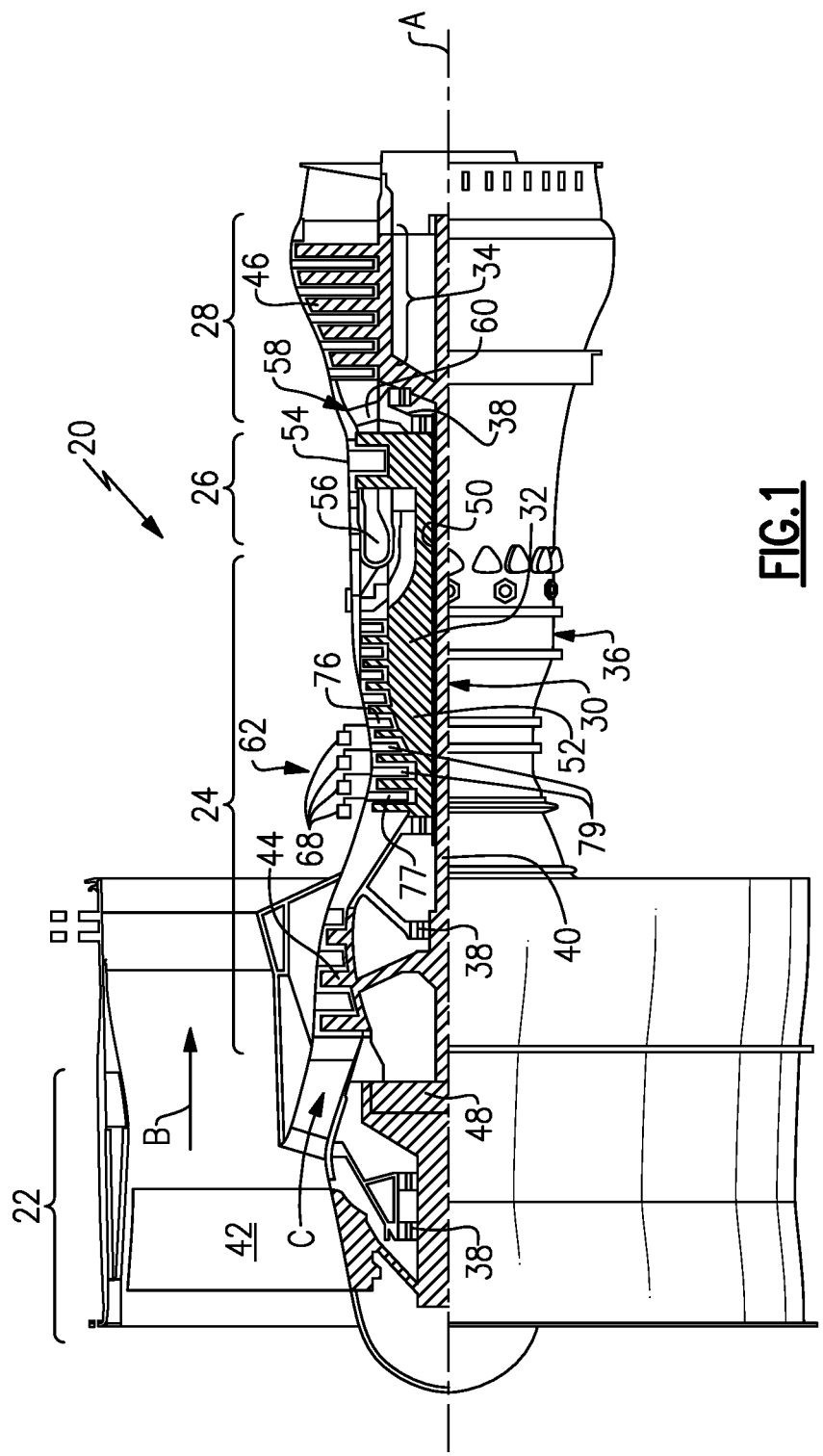
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
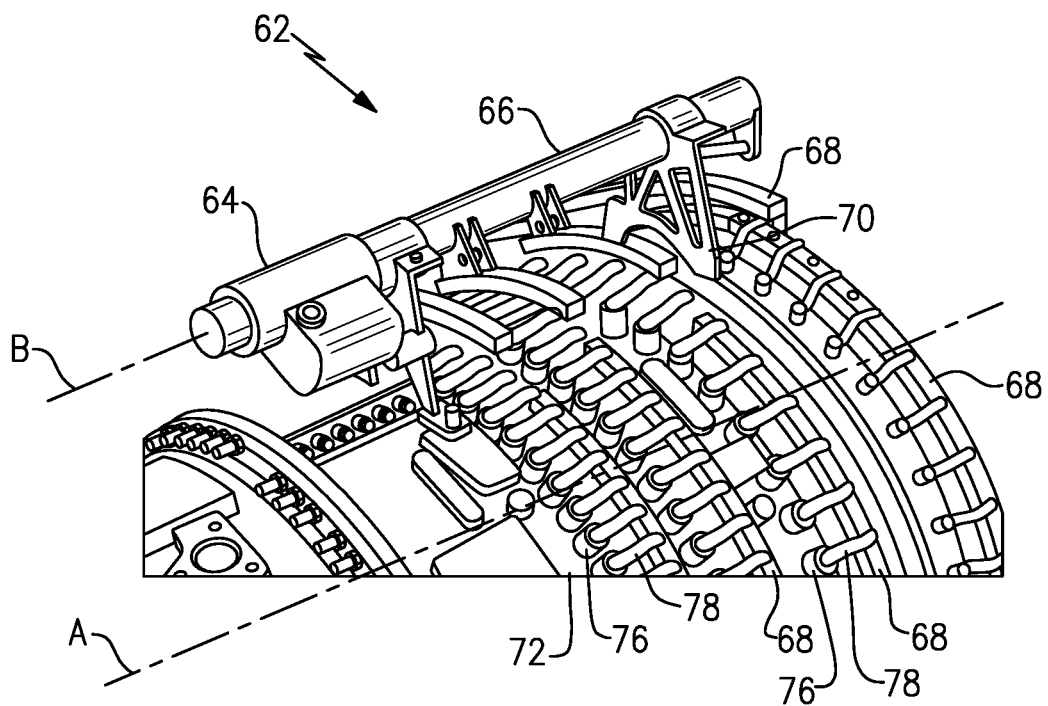
FIG. 2 is a perspective view of a variable vane actuator assembly.

FIG. 2 illustrates an example variable vane assembly 62 that includes a rotary actuator 64 and a crank shaft 66. The rotary actuator 64 rotates about an axis B extending along a length of the crank shaft 66 and parallel to the engine central longitudinal axis A. The rotary actuator 64 is located at an end of the crank shaft 66. The crank shaft 66 includes a generally tubular configuration. A ratio of the outer radius R1 to the inner radius R2 (FIG. 3) may be less than 2:1 for minimizing the amount of stress and deflection due to torsional loads.

Figure 3:
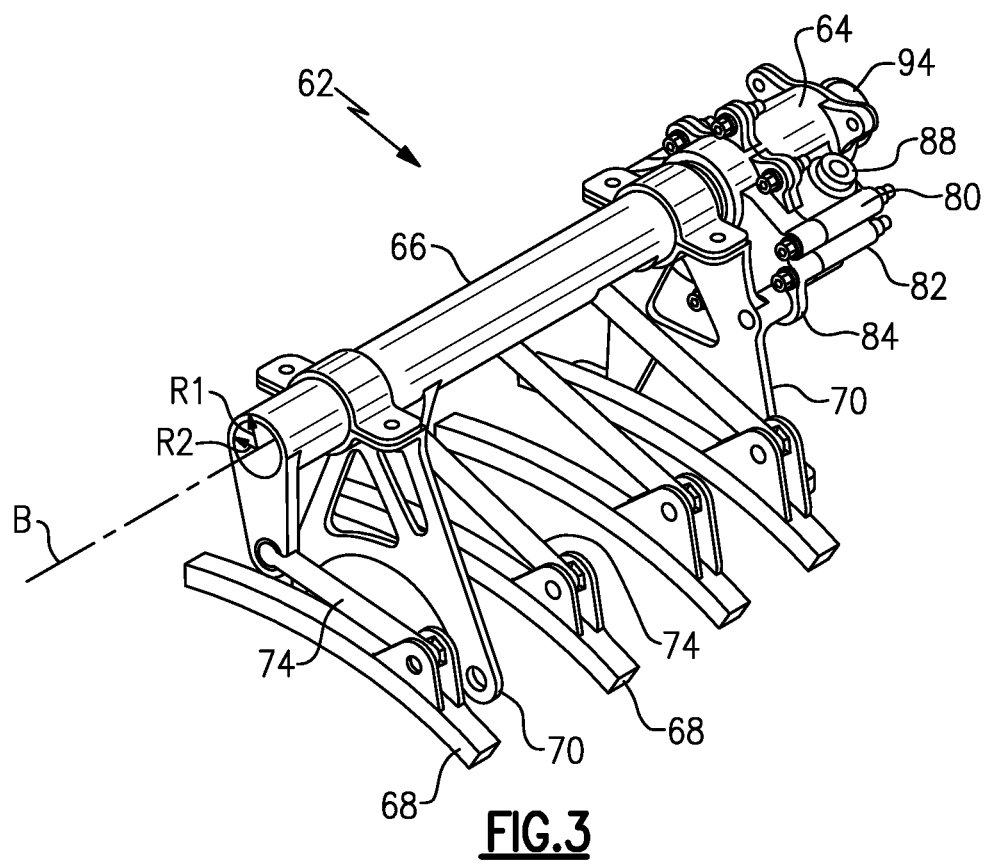
FIG. 3 is a perspective view of a portion of the variable vane actuator assembly of FIG. 2.

The crank shaft 66 is mechanically linked to a plurality of synchronization rings 68 via an actuator linkage 74, as shown in FIG. 3. Each of the synchronization rings 68 engages an outer surface of the high pressure compressor case 72. A plurality of variable vanes 76 (shown schematically in FIG. 1) are arranged about the engine central longitudinal axis A and are mechanically linked to the synchronization rings 68. Each of the synchronization rings 68 is connected to either the inlet guide vanes 77 or the stator vanes 79 of the high pressure compressor section 52.

Figure 4:
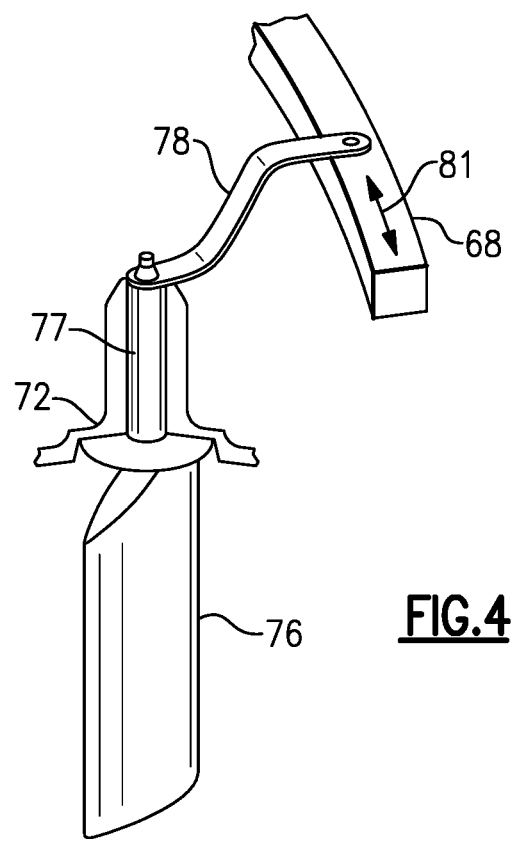
FIG. 4 is a perspective view of a portion of the variable vane actuator assembly of FIG. 2.

Referring to FIG. 4, a first end of the vane arm 78 extends through the compressor case 72 and is fixedly attached to an end portion of a corresponding variable vane 76. A second end of the vane arm 78 is rotatably attached to an adjacent synchronization ring 68. Therefore, as the crank shaft 66 rotates to extend or retract the actuator linkages 74, the synchronization rings 68 rotate around the compressor case 72 along arc 81 varying the angular position of the variable vanes 76 to adjust the amount of air drawn along the core flow path C. Although a single crank shaft 66 is shown in this example, the synchronization rings 68 may be rotated by more than one crank shaft. The variable vane assembly 62 also includes a pair of mounts 70 fixedly attached to a high pressure compressor case 72 for supporting the rotary actuator 64 and the crank shaft 66, as best seen in FIG. 3.

Figure 5:
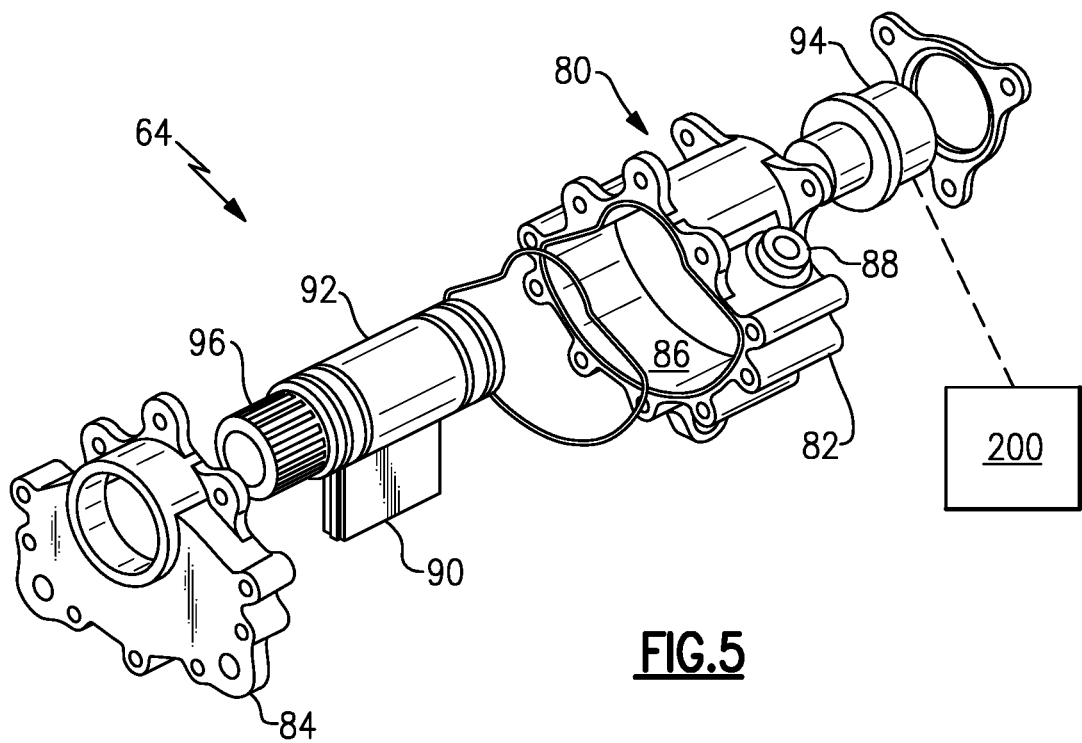
FIG. 5 is an exploded view of a rotary actuator.
Figure 6:
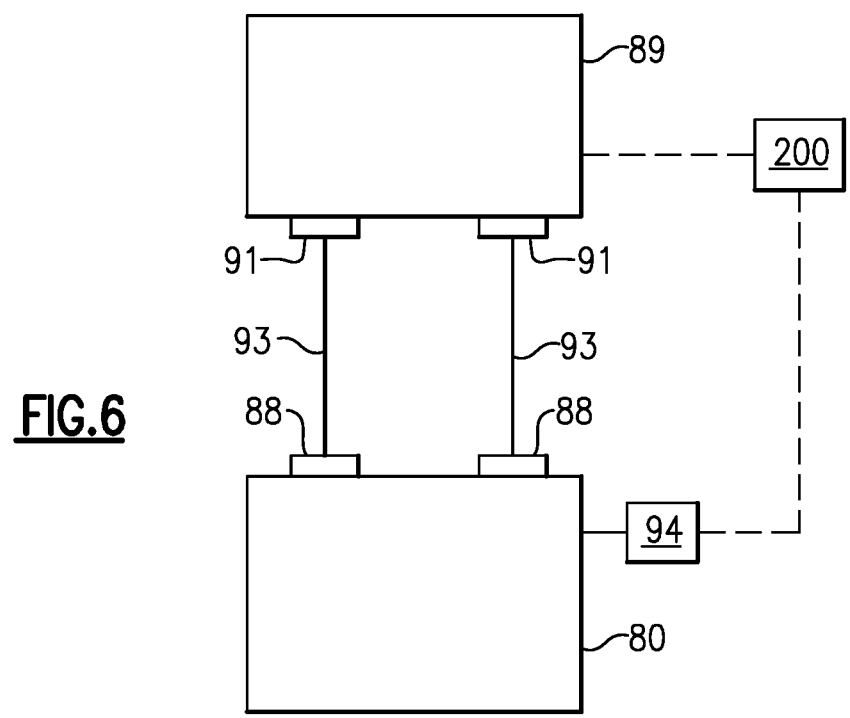
FIG. 6 is a schematic view of a portion of the variable vane actuator assembly of FIG. 5 in communication with a fuel source.

As shown in FIG. 5, the rotatory actuator 64 includes an example housing 80. The housing 80 includes a main body 82 and an end portion 84 that cooperate to define a cavity 86. The main body 82 defines a pair of actuator ports 88 for providing fluid communication between a fluid source and the cavity 86. In one example, the fluid source is a fuel source such as a fuel pump 89 including a pair of complementary ports 91 connected to the actuator ports 88 by a pair of fuel lines 93 (shown schematically in FIG. 6). Other types of fluid sources may be used such as hydraulic or pneumatic sources. The rotary actuator 64 also includes an actuator vane 90 disposed in the cavity 86 and an inner drive 92 connected to the actuator vane 90 partially disposed in the cavity 86 and extending through the end portion 84. The actuator vane 90 and the inner drive 92 may be integrally formed. The rotary actuator 64 also includes a rotary position sensor 94 for directly measuring an angular orientation of the crank shaft 66. In another example, the rotary position sensor 94 is located adjacent the crank shaft 66. A controller 200, shown schematically, reads the measurement from the rotary position sensor 94 for controlling the amount of fuel provided to the ports 88 from the fuel pump 89. Although a single-vane rotary actuator is shown in this example, a dual-vane rotary actuator may be used. The rotary vane style offers the zero backlash benefit. Other types of rotary actuators may also be used such as piston rack and pinion or screw-helical configurations.

Figure 7:
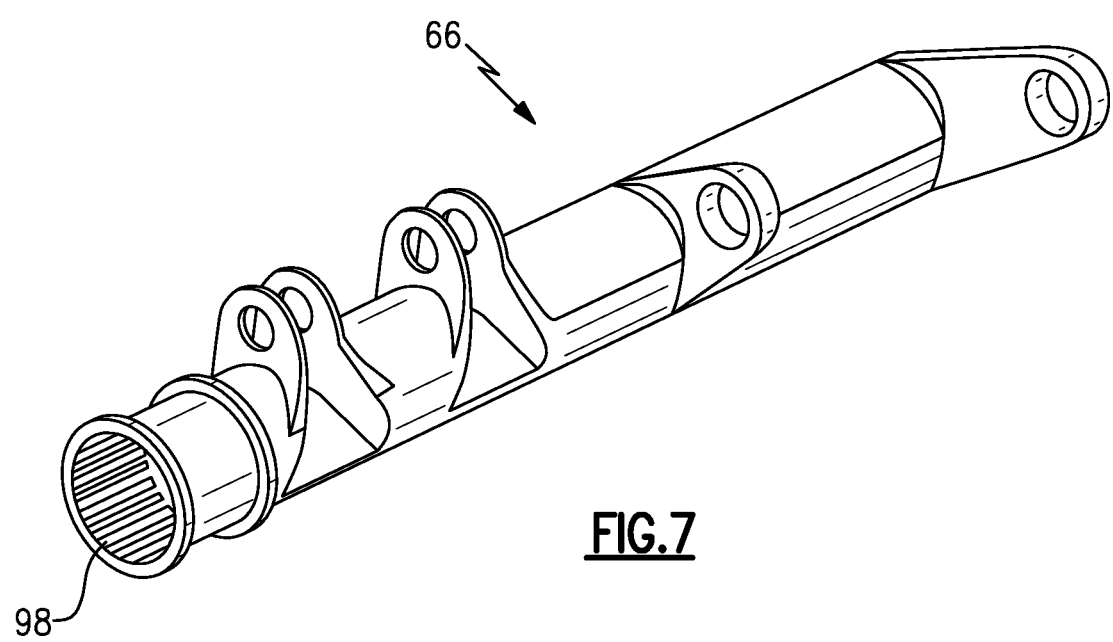
FIG. 7 is a perspective view of a crank shaft.

The inner drive 92 includes a first engagement feature 96. The crank shaft 66 includes a second engagement feature 98, as shown in FIG. 7. In one example, the engagement features 96, 98 each define a spline whereby the crank shaft 66 partially receives the inner drive 92. Accordingly, the direct connection between features 96, 98 prevents relative movement between the rotary actuator 64 and the crank shaft 66, thereby reducing inaccuracy caused by backlash. In another example, the spline is tapered. It should be appreciated that the engagement features 96, 98 may be directly connected to each other by other arrangements such as a pair of complementary gears, a notch and a groove, or by at least one fastener. In another example, the engagement features 96, 98 are welded to each other.

During operations, the controller 200 compares the angular orientation of the actuator vane 90 to one or more operating conditions of the aircraft including airspeed, throttle setting and density altitude. The controller sends a signal to the fuel pump 89 to adjust the amount of fuel provided each of the ports 88 of the actuator 64 once the angular orientation exceeds a predetermined range corresponding to adequate air flow along the core flow path C. Engine stability and fuel consumption is related the accuracy of positioning the angle of the vanes. Thus, the usage of a rotary actuator directly connected to the crank shaft reduces the amount of vane position error due to the configuration of the actuator and associated backlash, the number of mechanical connections in the system, and component wear.

Although the disclosed example is described in reference to a high pressure compressor 52, it is within the contemplation of this disclosure that it be utilized with another compressor or turbine section.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A variable vane actuator assembly comprising:
a plurality of vanes;
a synchronization ring surrounding and mechanically linked to drive said vanes to pivot for varying an angle of said vanes;
a crank shaft mechanically linked to said synchronization ring; and
a fluid actuated rotary motor located at an end of said crank shaft for selectively rotating said crank shaft.

2. The variable vane actuator assembly of claim 1, wherein said rotary motor includes a first engagement feature and said crank shaft includes a second engagement feature connected to said first engagement feature.

3. The variable vane actuator assembly of claim 2, wherein said first engagement feature and said second engagement feature are splines.

4. The variable vane actuator assembly of claim 2, wherein said first engagement feature and said second engagement feature are fastened to each other.

5. The variable vane actuator assembly of claim 1, wherein said crank shaft includes a generally tubular configuration.

6. The variable vane actuator assembly of claim 5, wherein a ratio of an outer radius to an inner radius of said crank shaft is less than 2:1.

7. The variable vane actuator assembly of claim 1, further comprising a rotary position sensor for measuring an angular orientation of said rotary motor.

8. The variable vane actuator assembly of claim 1, wherein said rotary motor is in fluid communication with a fuel source.

9. The variable vane actuator assembly of claim 1, wherein said rotary motor includes an actuator vane for selectively rotating said crank shaft when an amount of fluid pressure is applied to said actuator vane.

10. The variable vane actuator assembly of claim 9, wherein:
said crank shaft and said rotary motor are arranged about a longitudinal axis defined by said crank shaft, said longitudinal axis extending through said end of said crank shaft; and
said rotary motor includes a first engagement feature and said crank shaft includes a second engagement feature connected to said first engagement feature, each of said first engagement feature and said second engagement feature rotatable about said longitudinal axis.

11. The variable vane actuator assembly of claim 10, wherein said crank shaft includes a tubular body extending along said longitudinal axis between opposed first and second terminal ends such that said longitudinal axis extends through said first and second terminal ends of said crank shaft, said end of said crank shaft is said first terminal end, said longitudinal axis intersects said first engagement feature, and said rotary motor includes an actuator vane coupled to said first engagement feature, and said crank shaft rotates in response to applying an amount of fluid pressure to said actuator vane to cause said actuator vane to rotate about said longitudinal axis.

12. A gas turbine engine comprising:
a compressor section including a rotor section and a variable vane section adjacent said rotor section, said variable vane section including a plurality of vanes mounted to be capable of pivoting;
a synchronization ring surrounding and mechanically linked to drive said vanes to pivot for varying an angle of said vanes;
a crank shaft mechanically linked to said synchronization ring; and
a fluid actuated rotary motor located at an end of said crank shaft for selectively rotating said crank shaft.

13. The gas turbine engine of claim 12, wherein said crank shaft and said rotary motor are arranged about a first axis defined by said crank shaft, said first axis parallel to a longitudinal axis defined by said gas turbine engine.

14. The gas turbine engine of claim 13, further comprising:
a rotary position sensor for measuring an angular orientation of said rotary motor;
wherein said rotary motor includes an actuator vane for selectively rotating said crank shaft when an amount of fluid pressure is applied to said actuator vane;
wherein said rotary motor is in fluid communication with a fuel source;
wherein said crank shaft includes a generally tubular configuration;
wherein a ratio of an outer radius to an inner radius of said crank shaft is less than 2:1;
wherein said rotary motor includes a first engagement feature and said crank shaft includes a second engagement feature connected to said first engagement feature, said first axis extending through said end of said crank shaft; and
wherein said first engagement feature and said second engagement feature are splines.

15. The gas turbine engine of claim 12, wherein said rotary motor includes a first engagement feature and said crank shaft includes a second engagement feature connected to said first engagement feature.

16. The gas turbine engine of claim 15, wherein said first engagement feature and said second engagement feature are splines.

17. The gas turbine engine of claim 15, wherein said first engagement feature and said second engagement feature are fastened to each other.

18. The gas turbine engine of claim 15, wherein said crank shaft includes a tubular body extending along a longitudinal axis between opposed first and second terminal ends such that said longitudinal axis extends through said first and second terminal ends of said crank shaft, said end of said crank shaft is said first terminal end, said second engagement feature is defined along said first terminal end, and said longitudinal axis intersects said first engagement feature of said rotary motor.

19. The gas turbine engine of claim 12, wherein said crank shaft includes a generally tubular configuration.

20. The gas turbine engine of claim 19, wherein a ratio of an outer radius to an inner radius of said crank shaft is less than 2:1.

21. The gas turbine engine of claim 12, further comprising a rotary position sensor for measuring an angular orientation of said rotary motor.

22. The gas turbine engine of claim 12, wherein said rotary motor is in fluid communication with a fuel source.

23. The gas turbine engine of claim 12, wherein said rotary motor includes an actuator vane for selectively rotating said crank shaft when an amount of fluid pressure is applied to said actuator vane.

24. A variable vane actuator assembly comprising:
a plurality of vanes;
a synchronization ring surrounding and mechanically linked to drive said vanes to pivot for varying an angle of said vanes;
a crank shaft mechanically linked to said synchronization ring;
a fluid actuated rotary motor located at a first end of said crank shaft for selectively rotating said crank shaft, wherein said rotary motor includes an actuator vane for selectively rotating said crank shaft when an amount of fluid pressure is applied to said actuator vane;
a rotary position sensor for measuring an angular orientation of said rotary motor;
wherein said rotary motor is in fluid communication with a fuel source;
wherein said crank shaft includes a generally tubular configuration;

wherein said rotary motor includes a first engagement feature and said crank shaft includes a second engagement feature connected to said first engagement feature; and wherein said first engagement feature and said second engagement feature are splines.

25. The variable vane actuator assembly of claim 24, wherein:

said crank shaft includes a tubular body that extends along a longitudinal axis between said first end and a second end opposed to said first end; and said rotary motor includes an inner drive arranged along said longitudinal axis, said inner drive comprising said first engagement feature, and said inner drive is connected to said actuator vane such that said inner drive and said actuator vane are rotatable about said longitudinal axis.

26. The variable vane actuator assembly of claim 25, wherein said inner drive is at least partially received in said first end of said crank shaft.

27. The variable vane actuator assembly of claim 25, wherein said inner drive and said actuator vane are integrally formed, and a ratio of an outer radius to an inner radius of said crank shaft is less than 2:1.

\* \* \* \* \*